(12) United States Patent
Buergel et al.

(10) Patent No.: US 7,238,749 B2
(45) Date of Patent: Jul. 3, 2007

(54) TWO-COMPONENT MORTAR COMPOSITION AND ITS USE

(75) Inventors: Thomas Buergel, Landsberg am Lech (DE); Rainer Hettich, Munich (DE); Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/187,226

(22) Filed: Jul. 21, 2005

(65) Prior Publication Data
US 2006/0045630 A1 Mar. 2, 2006

(30) Foreign Application Priority Data
Jul. 22, 2004 (DE) .................. 10 2004 035 567

(51) Int. Cl.
*C08K 5/07* (2006.01)
*C08K 5/05* (2006.01)
(52) U.S. Cl. .................. 525/257; 525/298; 525/7.4; 525/7.1; 523/130; 524/906
(58) Field of Classification Search ............. 525/257, 525/298, 7.4, 7.1; 523/130; 524/906
See application file for complete search history.

(56) References Cited
U.S. PATENT DOCUMENTS
5,854,305 A * 12/1998 Schwiegk et al. .......... 523/130

\* cited by examiner

*Primary Examiner*—David W. Wu
*Assistant Examiner*—Satya B. Sastri
(74) *Attorney, Agent, or Firm*—Abelman, Frayne & Schwab

(57) ABSTRACT

A two-component mortar composition is described with a curable resin component containing at least one free radical-polymerizable resin, fillers, reactive diluents, solvents, accelerators and/or further conventional mortar components and, separated therefrom to inhibit reaction, a curing agent component for chemically fastening anchoring means in boreholes, characterized in that the resin component, in order to improve the adhesion to different mineral substrates of the borehole, contains a reactive diluent mixture of at least one hydroxyalkyl (meth)acrylate and at least one acetoacetoxyalkyl (meth)acrylate. Furthermore, the use of the two-component mortar composition for chemically fastening anchoring means in boreholes of different mineral substrates is also described.

15 Claims, No Drawings

TWO-COMPONENT MORTAR COMPOSITION AND ITS USE

FIELD OF INVENTION

The present invention relates to a two-component mortar composition with a curable resin component containing at least one free radical-polymerizable resin, fillers, reactive diluents, solvents, accelerators and/or further conventional mortar components and, separated therefrom to inhibit reaction, a curing agent component for chemically fastening anchoring means in boreholes, as well as its use for chemically fastening such anchoring means in boreholes of different mineral substrate.

BACKGROUND INFORMATION AND PRIOR ART

Chemical mortar compositions and dowel compositions based on free radical-curing reaction resins have long been known. These reaction resins, as a rule, are composed of a curable resin component and a curing agent component. The curable resin component comprises, for example, a reactive polymer as well as a monomer capable of cross-linking, which is also referred to as a reactive diluent and serves to adjust the viscosity of the mortar composition and, by reaction during the curing, participates in the consolidation of the material, as well as fillers and conventional additives.

For example, DE 32 26 602 A1 describes a curable two-component mortar composition, which contains an unsaturated polyester resin, a reactive diluent, fillers, a thixotropic agents and a free radical-curing catalyst. In this connection, styrene or divinyl benzene is used as a reactive diluent.

The object of DE 36 17 702 A1 is a curable agent for fastening dowels and anchor rods and contains a curable acrylate, which, in addition to an organic peroxide curing agent, an accelerator, a desensitizing agent, mineral fillers and thixotropic agents, contains a reactive diluent. As reactive diluent, styrene, divinyl benzene, allyl esters of multibasic acids, methyl methacrylate, isopropyl methacrylate and isobutyl methacrylate are mentioned.

The DE 39 40 309 A1 also describes a mortar composition for fastening anchor rods in solid accommodating materials, the mortar composition containing free radical-curable vinyl ester urethane resins and a reactive diluent as optional component. Styrene, divinyl benzene, acrylates and the methacrylates are also mentioned as reactive diluents in this publication.

The DE 42 31 161 A1 also discloses a two-component mortar for fastening anchor rods in boreholes, the mortar containing hydraulically setting and/or polycondensable compounds as inorganic, curable compounds and curable vinyl esters as organic curable compounds. As reactive diluents, monofunctional and polyfunctional acrylate and methacrylate esters are named according to the teachings of this state of the art.

Finally, in the DE 41 31 457 A1, a two-component mortar composition for fastening anchor rods, dowels and screws in boreholes chemically is described. It contains a free radical-curable vinyl ester resin or vinyl urethane resin and, spatially separated therefrom, a curing agent for the resin, as well an acetoacetoxyalkyl (meth)acrylate as comonomer for achieving good adhesion to silicatic materials.

With the help of the last-mentioned styrene-free chemical fastening system, it has become possible to optimize the reaction resins specifically for certain substrates by the selection of reactive diluents. Accordingly, it has turned out that good wetting, polar, low viscosity monomers, such as hydroxyalkyl methacrylates, are suitable for achieving good adhesion to substrates of concrete. On absorptive substrates, such as bricks and roofing tiles which, moreover, contain appreciable amounts of iron ions, which interfere with the free radical curing with diacyl peroxides, the use of less polar monomers of higher viscosity, such acetoacetoxyalkyl (meth)acrylates, has proven its value. These monomers have proven to be suitable for forming chemical fastening systems, which are designed for solid brick and hollow brick substrates.

Although it is known that two-component mortar compositions may be adapted to specific substrates by the appropriate selection of reactive diluents, it has turned out, on the other hand, that these mortar compositions exhibit appreciable weaknesses on other substrates and do not permit the necessary adhesion to be achieved. Accordingly, it was discovered by the inventors that the performance of a two-component mortar composition, which contains hydroxyalkyl methacrylates, such as hydroxyethyl methacrylate or hydroxypropyl methacrylate as reactive diluent, suffers drastically on bricks, because these reactive diluents evidently penetrate rapidly into the absorptive substrate and, with that, do not lead to the desired adhesion in the region of the bonded surface.

On the other hand, the investigations of the inventors have shown that the two-component mortar compositions, which are known from DE 41 31 457 A1 and contain acetoacetoxyalkyl (meth)acrylates as reactive diluents, do not exhibit satisfactory adhesion values, if they are used on concrete instead of on brick substrates. He also there is evidently interference with the curing in the region of the boundary layer between the mortar composition and the substrate.

It therefore follows from the state of the art that two-component mortar compositions for the chemical fastening technique, due to the combination of reactive resin, filler and auxiliary materials, exhibit a flow, wetting and adhesion behavior, which can be optimized only for a specific substrate and results in significantly inferior adhesion on other substrates. Consequently, for producing a two-component mortar composition, which has a balanced performance on all conventional mineral substrates, it had to be assumed that it is necessary to make compromises, as a result of which this performance level is clearly lower than the performance level of mortar compositions, which had been optimized especially for a particular substrate.

It was therefore to be expected that, if the reactive diluents, known from the state-of-the-art, are combined for different fastening bases, mortar compositions would be obtained, which would not ensure satisfactory adhesion on any of the substrates mentioned. On the other hand, two-component mortar compositions which do not contain such reactive diluents, would achieve an adhesion, which does not do justice to the requirements raised and, in no case, would reach the performance of mortar compositions, which had been optimized for the specific substrates.

Surprisingly, it has now turned out that the object, on which the present invention is based, can be accomplished owing to the fact that a reactive diluent mixture of at least one hydroxyalkyl (meth)acrylate and at least one acetoacetoxyalkyl (meth)acrylate is used in a two-component mortar composition of the type given above.

OBJECT OF THE INVENTION

The object of the invention therefore is the two-component mortar composition of the main claim. The dependent claims relate to preferred embodiments of this inventive object, as well as to the use of this two-component mortar composition for chemically fastening anchoring means such as anchor rods, dowels and screws in boreholes of different mineral substrates.

The object of claim 1 therefore is a two-component mortar composition with a curable resin component containing at least one free radical-polymerizable resin, fillers, reactive diluents, solvents, accelerators and/or further conventional mortar components and a curing agent component, which is disposed separately therefrom to inhibit reaction, for the chemical fastening anchoring means in boreholes, the composition being characterized in that the resin component, to improve the adhesion to different mineral substrates of the borehole, contains a reactive diluent mixture of at least one hydroxyalkyl (meth)acrylate and at least one acetoacetoxyalkyl (meth)acrylate.

SUMMARY OF THE INVENTION

Surprisingly, it has turned out that the inventive two-component mortar composition exhibits good adhesion on concrete substrates as well as on brick substrates and that this adhesion is clearly better than that of two-component mortar compositions, which have been optimized by selecting their reactive diluent for use in concrete or for use in brick substrates. In this connection, reference is made to the examples and comparison examples given further below.

Preferably, the reactive diluent mixture, used pursuant to the invention, contains hydroxyalkyl (meth)acrylate and acetoacetoxyalkyl (meth)acrylate in a ratio by weight of 1.5:1 to 5.2:1, especially of 2:1 to 3.5:1 and, in particular, of about 3:1.

In accordance with a preferred embodiment, the reactive diluent picture is contained in the resin component in an amount of 5 to 35% by weight and preferably of 10 to 30% by weight.

Preferably, the reactive diluent picture contains, as hydroxy alkyl (meth)acrylate, at least one representative of the group comprising hydroxyethyl methacrylate and hydroxypropyl methacrylate. On the other hand, as preferred acetoacetoxyalkyl methacrylate, at least one representative of the group comprising acetoacetoxyethyl methacrylate and acetoacetoxypropyl methacrylate is used.

As free radical-polymerizable resin, the inventive, two-component mortar composition preferably contains at least one representative of the group comprising unsaturated polyester resins, vinyl ester resins and vinyl ester urethane resins. As vinyl ester urethane resins, preferably urethane dimethacrylate polymers and, as unsaturated polyester resins, unsaturated polyester resins based on o- and/or iso-phthalic acid, maleic acid or fumaric acid as dicarboxylic acid and low molecular weight aliphatic polyols, preferably diols, are used.

Pursuant to the invention, it is furthermore possible to introduce a monofunctional and/or difunctional reactive diluent, such as methyl methacrylate, ethyl methacrylate, polyethylene glycol methacrylate, butane diol dimethacrylate, ethylene glycol dimethacrylate, diethylene glycol dimethacrylate and/or triethylene glycol dimethacrylate into the resin component, in order to improve the viscosity of the mortar composition further and, at the same time, to bring about more cross linking of the resin components.

As filler, the claimed two-component mortar composition may contain the usual materials, such as quartz, pyrogenic silica, glass, corundum, porcelain, crockery, barite, light spar, talcum, cement and/or chalk.

As accelerator for the curing reaction, the inventive two-component mortar composition preferably contains an aromatic amine, a toluidine or a xylidine and/or a salt of cobalt, manganese, tin or cerium. N,N-Dimethylaniline, N,N-diethylaniline, N,N-diisopropylidine-p-toluidine, N,N-dimethyl-p-toluidine, N,N-diisopropylol-p-toluidine, N,N-diethylol-p-toluidine, N-bis(2-hydroxyethyl)-xylidine, cobalt octoate and/or cobalt naphthenate are preferred accelerators.

As curing agent, the inventive, two-component mortar composition may contain benzoyl peroxide, methyl ethyl ketone peroxide, t-butyl perbenzoate, cyclohexanone peroxide, lauroyl peroxide, cumyl hydroperoxide and/or t-butylperoxy-2-ethyl hexanoate. The curing agent is present in the separately disposed curing agent component in an amount of 0.5 to 10% by weight and preferably of 3 to 8% by weight, based on the free radical-polymerizable resin.

As further, conventional mortar components, the inventive two-component mortar composition may contain water as desensitizing agent in the curing agent component and/or t-butylcatechol and/or 4-hydroxy-2,2,6,6-tetramethylpiperindinyl-1-oxide (tempol) as polymerization inhibitor in the resin component.

A further object of the invention is the use of the above-described two-component mortar composition for chemically fastening anchoring means, such as anchor rods, dowels and screws in boreholes of different mineral substrates, that is, substrate based, for example, on concrete, foamed concrete, masonry, chalky sandstone, sandstone, natural stone and the like.

The inventive two-component mortar composition comprises the curable resin component and the curing agent component separated, so as to inhibit reaction, in different containers, for example, of a multi-chamber device, such as a multi-chamber cartridge and/or pressure cylinder, from which the two components are expressed by the action of mechanical pressing forces or by the action of a gas pressure and mixed. A further possibility consists of accommodating the inventive two-component mortar composition in two-component capsules, which are introduced into the borehole and are destroyed by the beating and rotating settling of the fastening element with simultaneous mixing of the two components of the mortar composition. Preferably, a cartridge system or an injection system is used, for which the two components are expressed from the separate containers and pass through a static mixer, in which they are mixed homogeneously and then discharged through a nozzle, preferably directly into the borehole.

The following examples are intended to explain the invention further.

EXAMPLE 1

Inventive Two-Component Mortar Composition

Initially, a curing agent component of the following composition is prepared, which, moreover, is also used in the following Examples 2 and 3:

TABLE 1

| Component | % by weight |
|---|---|
| Dibenzoyl peroxide paste (peroxide content: 75% by weight) | 10.00 |
| Water | 30.00 |
| Powdered quartz with an average particle size < 0.01 mm | 57.50 |
| Pyrogenic silica | 2.50 |
| Total | 100.00 |

The curing agent component is obtained by mixing the constituents, given in the above Table, homogeneously.

The curable resin component is prepared by mixing the constituents, given in the following Table 2:

TABLE 2

| Component | % by weight |
|---|---|
| Urethane dimethacrylate polymer | 19.50 |
| Butane diol dimethacrylate | 12.50 |
| Hydroxypropyl methacrylate | 9.00 |
| Acetoacetoxyethyl methacrylate | 3.00 |
| p-Toluidine (accelerator) | 1.25 |
| t-Butylcatechol (polymerization inhibitor) | 0.25 |
| Quartz sand with an average particle size of 0.4 mm | 23.00 |
| Quartz sand with an average price of the size of < 0.05 mm | 29.00 |
| Pyrogenic silica | 2.50 |
| Total | 100.00 |

The above, inventive, curable resin component contains the reactive diluent, hydroxypropyl methacrylate and acetacetoxyethyl methacrylate, in a ratio by weight of 3:1.

The curable resin component and the curing agent component are brought separately into a reaction-inhibiting two-component cartridge with static mixer and, moreover, in such amounts, that the mixing ratio by volume of resin component to curing agent is 3:1.

EXAMPLE 2

Comparison Example V1

A curable resin component for a two-component mortar composition, optimized for use in concrete, is prepared by mixing the constituents given in the following Table 3.

TABLE 3

| Component | % by weight |
|---|---|
| Urethane dimethacrylate polymer | 13.00 |
| Butane diol dimethacrylate | 13.00 |
| Hydroxypropyl methacrylate | 13.00 |
| P-Toluidine (accelerator) | 0.95 |
| T-Butylcatechol (polymerization inhibitor) | 0.25 |
| Quartz sand with an average particle size of 0.4 mm | 20.00 |
| Quartz sand with an average particle size of < 0.05 mm | 37.50 |
| Pyrogenic silica | 2.30 |
| Total | 100.00 |

The curable resin components, together with the curing agent component given in Example 1, are brought separately into a two-component cartridge having a static mixer.

EXAMPLE 3

Comparison Example V2

A curable resin component for a two-component mortar composition, which is optimized for use in brick substrates, is prepared by mixing the constituents given in the following Table 4:

TABLE 4

| Component | % by weight |
|---|---|
| Urethane dimethacrylate polymer | 24.00 |
| Butane diol dimethacrylate | 17.00 |
| Acetoacetoxyethyl methacrylate | 5.50 |
| p-Toluidine (accelerator) | 1.25 |
| t-Butylcatechol (polymerization inhibitor) | 0.25 |
| Quartz sand with an average particle size of 0.4 mm | 23.00 |
| Quartz sand with an average particle size of < 0.05 mm | 26.00 |
| Pyrogenic silica | 3.00 |
| Total | 100.00 |

These curable resin components, together with the curing agent component given in Example 1, are brought separately into a two-component cartridge having static mixer.

EXAMPLE 4

Investigation of the Technical Capability of the Two-Component Mortar Composition of Examples 1 to 3

Holes with an internal diameter of 14 mm and a depth of 110 mm are drilled into substrates of concrete (C20/25) and solid brick (MZ12). The holes drilled are blown out dry and brushed.

The two-component mortar compositions of Examples 1 to 3, present in the two-component cartridges having static mixers, are expressed by the static mixer and mixed there and injected into the holes drilled. The M12 anchor rods are then brought in to the boreholes and the mortar composition is allowed to cure for 24 hours at room temperature.

Subsequently, the extraction force of the fastened anchor rods is determined by central extraction with a narrow support of the hydraulically operated extraction device and the failure load F is determined. In each case, 5 anchor rods are extracted and an average of the failure load F in kN and the scatter v in percent are determined.

The results obtained during these extraction experiments are given in the following Table 5.

TABLE 5

| | Composition | | | | | |
|---|---|---|---|---|---|---|
| | Inventive Example 1 | | Comparison V1 Example 2 | | Comparison V2 Example 3 | |
| Substrate | F | v | F | v | F | V |
| Concrete | 87.6 | 6.6 | 76.3 | 4.8 | 67.3 | 3.5 |
| Solid brick MZ121 | 35.7 | 5.2 | 14.5 | 11.1 | 29.1 | 10.5 |

The above Table shows that the inventive two-component mortar composition results in a higher extraction force in concrete as well as in solid bricks than does the comparison composition of comparison examples 2 and 3, which has been optimized for the respective substrates. This state of affairs must be regarded as surprising because, on the basis of the known behavior of the reactive diluent used, it was to be expected that, in the best case, extraction forces would be achieved, which are as high as those for the mortar compositions optimized for the respective substrates. Since an increased adhesion to the two different substrates compared is achieved with the inventive, curable mortar composition, this must be regarded as an unexpected, synergistic effect.

Moreover, it must be noted that, according to the present state of the art, efficient compositions should achieve a failure load F of at least 75 kN in concrete and of at least 25 kN in solid brick, with scatters of <7.5%. However, this objective is achieved only with the inventive, two-component mortar composition.

The invention claimed is:

1. Two-component mortar composition with:
   a curable resin component containing at least one free radical polymerizable resin, 5 to 35% by weight of reactive diluent mixture of at least one hydroxyalkyl (meth)acrylate and at least one acetoacetoxyalkyl (meth) acrylate in a ratio by weight from 1.5 to 5.2:1, filler, solvent, and accelerator; and
   separated therefrom to inhibit reaction, a curing agent component.

2. The two-component mortar composition of claim 1, characterized in that it contains, as hydroxyalkyl (meth) acrylate, at least one representative of the group comprising hydroxyethyl methacrylate and hydroxy-propyl methacrylate.

3. The two-component mortar composition of claim 1, characterized in that it contains, as acetoacetoxyalkyl (meth) acrylate, at least one representative of the group comprising acetoacetoxyethyl methacrylate and acetoacetoxypropyl methacrylate.

4. The two-component mortar composition of claims 1, characterized in that it contains, as free radical-polymerizable resin, at least one representative of the group comprising unsaturated polyester resins, vinyl ester resins and vinyl ester urethane resins.

5. The two-component mortar composition of claim 4, characterized in that it contains, as vinyl ester urethane resin, a urethane dimethacrylate polymer and/or as unsaturated polyester resin, an unsaturated polyester resin based on o-and/or iso phthalic acid, maleic acid or fumaric acid as dicarboxylic acids and low molecular weight aliphatic polyols.

6. The two-component mortar composition of claim 1, characterized in that it additionally contains a difunctional reactive diluent.

7. The two-component mortar composition of claim 6, characterized in that, as difunctional reactive diluent, it contains butane diol dimethacrylate, ethylene glycol dimethacrylate, diethylene glycol dimethacrylate and/or triethylene glycol dimethacrylate.

8. The two-component mortar composition of claim 1, characterized in that it contains quartz, pyrogenic silica, glass, corundum, porcelain, crockery, barite, light spar, talcum, cement and/or chalk as filler.

9. The two-component mortar composition of claim 1, characterized in that it contains an aromatic amine, a toluidine or a xylidine and/or a salt of cobalt, manganese, tin or cerium salt as accelerator.

10. The two-component mortar composition of claim 9, characterized in that it contains, as accelerator, N,N-dimethylaniline, N,N-diethylaniline, N,N-diisopropylidine-p-toluidine, N,N-dimethyl-p-toluidine, N,N-diisopropylol-p-toluidine, N,N-diethylol-p-toluidine, N-bis(2-hydroxyethyl)-xylidine, cobalt octoate and/or cobalt naphthenate.

11. The two-component mortar composition of claim 1, characterized in that it contains benzoyl peroxide, methyl ethyl ketone peroxide, t-butyl perbenzoate, cyclohexanone peroxide, lauroyl peroxide, cumyl hydroperoxide and/or t-butylperoxy-2-ethyl hexanoate as curing agent.

12. The two-component mortar composition of claim 11, characterized in that it contains the curing agent in an amount of 0.5 to 10% by weight based on the free radical-polymerizable resin.

13. The two-component mortar composition of claim 1, characterized in that it contains as further mortar component, water in the curing agent component and/or t-butylcatechol and/or 4-hydroxy-2,2,6,6-tetramethylpiperindinyl-1-oxide as polymerization inhibitor in the resin component.

14. The two-component mortar composition of claim 6, characterized in that the low molecular weight aliphatic polyols are diols.

15. The two-component mortar composition of claim 12, characterized in that the curing agent is contained in an amount of 3 to 8% by weight.

* * * * *